US010526506B2

(12) United States Patent
Matthieu et al.

(10) Patent No.: US 10,526,506 B2
(45) Date of Patent: Jan. 7, 2020

(54) POLYESTER COATING COMPOSITIONS CONTAINING POLYMERS DERIVED FROM CYCLIC CARBONATES

(71) Applicant: SWIMC LLC, Cleveland, OH (US)

(72) Inventors: Andriot Matthieu, Attignat (FR); Sebastien Gibanel, Givry (FR); Benoit Prouvost, Abergement de Cuisery (FR)

(73) Assignee: SWIMC LLC, Cleveland, OH (US)

( * ) Notice: Subject to any disclaimer, the term of this patent is extended or adjusted under 35 U.S.C. 154(b) by 292 days.

(21) Appl. No.: 15/127,995

(22) PCT Filed: Mar. 30, 2015

(86) PCT No.: PCT/US2015/023317
§ 371 (c)(1),
(2) Date: Sep. 21, 2016

(87) PCT Pub. No.: WO2015/149064
PCT Pub. Date: Oct. 1, 2015

(65) Prior Publication Data
US 2017/0088745 A1 Mar. 30, 2017

Related U.S. Application Data

(60) Provisional application No. 61/971,779, filed on Mar. 28, 2014.

(51) Int. Cl.
B65D 25/14 (2006.01)
B65D 85/72 (2006.01)
C08G 63/64 (2006.01)
C09D 167/00 (2006.01)
C09D 167/07 (2006.01)
C08G 63/47 (2006.01)
C08G 63/668 (2006.01)

(52) U.S. Cl.
CPC .......... *C09D 167/00* (2013.01); *B65D 25/14* (2013.01); *B65D 85/72* (2013.01); *C08G 63/47* (2013.01); *C08G 63/64* (2013.01); *C08G 63/668* (2013.01); *C09D 167/07* (2013.01)

(58) Field of Classification Search
CPC ........ C08G 63/02; C08G 63/12; C08G 63/16; C08G 63/42; C08G 63/58; C08G 63/46; C08G 63/47; C08G 63/133; C08G 63/64; C08D 167/02; C08D 167/025; C08D 167/03; C08D 167/04; C08D 167/06; C08D 167/07; C08D 167/08; C09D 133/04; C09D 133/06; C09D 67/00; C08J 2367/00; C08J 2367/02; C08J 2367/03; C08J 2367/04; C08J 2367/06; C08J 2367/07; C08J 2367/08; Y10T 428/31786; B65D 25/14
USPC ................................................ 528/193, 196
See application file for complete search history.

(56) References Cited

U.S. PATENT DOCUMENTS

| 2,448,767 A | 9/1948 | Carlson |
| 2,967,892 A | 1/1961 | Smith |
| 2,987,555 A | 6/1961 | Davis |
| 3,103,834 A | 9/1963 | Seiner |
| 4,261,922 A | 4/1981 | Kem |
| 4,310,706 A | 1/1982 | Strege |
| 4,310,707 A | 1/1982 | Strege |
| 4,310,708 A | 1/1982 | Strege et al. |
| 4,341,905 A | 7/1982 | Strege |
| 4,348,314 A | 9/1982 | Lazarus et al. |
| 5,059,723 A | 10/1991 | Dressler |
| 5,679,871 A | 10/1997 | Nava |
| 5,714,568 A | 2/1998 | Nava |
| 5,969,056 A | 10/1999 | Nava |
| 5,998,568 A | 12/1999 | Nava et al. |
| 6,063,827 A * | 5/2000 | Sacripante ............. C08G 63/58 430/108.1 |
| 6,229,054 B1 | 5/2001 | Dai et al. |
| 6,303,732 B1 | 10/2001 | Durairaj |
| 6,498,278 B1 | 12/2002 | Clements et al. |
| 6,586,607 B1 | 7/2003 | Durairaj et al. |
| 6,624,333 B1 | 9/2003 | Koser et al. |
| 7,084,103 B1 | 8/2006 | Springsted et al. |
| 7,326,765 B1 | 2/2008 | Tzap et al. |
| 7,332,557 B2 | 2/2008 | Shinohara et al. |
| 8,129,495 B2 | 3/2012 | Evans et al. |
| 8,481,645 B2 | 7/2013 | Payot et al. |
| 2002/0006514 A1 | 1/2002 | Webster et al. |

(Continued)

FOREIGN PATENT DOCUMENTS

| EP | 0 974 612 A2 | 1/2000 |
| WO | WO2012051540 | 4/2012 |
| WO | WO2013119686 | 8/2013 |

OTHER PUBLICATIONS

Clements, John H. "Reactive applications of cyclic alkylene carbonates", Industrial & Engineering Chemistry Research, 2003, pp. 663-674, Jan. 15, 2003 (Year: 2003).*
Khanna, AS. High-performance organic coatings, 2008, CRC Press, Boca Raton, FL, pp. 174-177 (Year: 2008).*
International Search Report for International Application No. PCT/US2015/023317 dated Jul. 9, 2015.
Clements, John H., "Reactive Applications of Cyclic Alkylene Carbonates", Industrial & Engineering Chemistry Research. Jan. 15, 2003.
Benyahya et al. "Synthesis of Glycerin Carbonate-based Intermediates Using Thiol-ene Chemistry and Isocyanate Free Polyhydroxyurethanes Therefrom", Polym. Chem., (2011) 2, 2661.

(Continued)

*Primary Examiner* — Lee E Sanderson
(74) *Attorney, Agent, or Firm* — Patterson Thuente Pedersen, P.A.

(57) ABSTRACT

A coating composition is provided that includes (a) a polyester polymer derived by esterifying an aryloxy ether polyol (e.g., an aryloxy ether diol) derived from reaction between a polyhydric phenol or a polyphenol and a non-hydroxyl functional cyclic carbonate, or from reaction between a monophenol and a hydroxyl functional cyclic carbonate; (b) a crosslinker and (c) an optional catalyst.

18 Claims, No Drawings

(56) References Cited

U.S. PATENT DOCUMENTS

| | | | |
|---|---|---|---|
| 2003/0054276 A1* | 3/2003 | Moriyama | G03G 9/0833 430/106.2 |
| 2003/0087208 A1* | 5/2003 | Bourdelais | B41M 5/502 430/496 |
| 2003/0170396 A1 | 9/2003 | Yokoi et al. | |
| 2003/0232145 A1 | 12/2003 | Inomata et al. | |
| 2004/0044101 A1 | 3/2004 | Hirose et al. | |
| 2005/0196629 A1 | 9/2005 | Bariatinsky et al. | |
| 2009/0198005 A1* | 8/2009 | Brandenburger | C08G 63/81 524/356 |
| 2010/0002963 A1* | 1/2010 | Holbert | B65D 75/5838 383/204 |
| 2011/0315591 A1 | 12/2011 | Lespinasse et al. | |
| 2012/0125800 A1 | 5/2012 | Doreau et al. | |
| 2013/0052381 A1 | 2/2013 | Gallucci et al. | |
| 2013/0123456 A1 | 5/2013 | Caillol et al. | |
| 2013/0206756 A1 | 8/2013 | Niederst et al. | |
| 2013/0224413 A1 | 8/2013 | Prouvost et al. | |
| 2013/0316109 A1 | 11/2013 | Niederst et al. | |
| 2014/0072912 A1* | 3/2014 | Sacripante | G03G 9/08755 430/137.15 |
| 2014/0322641 A1* | 10/2014 | Zhou | C08G 63/02 430/109.4 |
| 2016/0017176 A1 | 1/2016 | Wonnemann | |

OTHER PUBLICATIONS

Dr. Sylvain Caillol, "BiPoCo 2012 synthesis of bio-based building blocks from vegetable oils: toward platform chemicals" Lake Balaton, Hungary, May 28, 2012.

Dr. Sylvain Caillol, "Journées chevreul synthesis of bio-based building blocks from vegetable oils: toward platform chemicals" Maison Alfort, France. Jun. 5, 2012.

Desroches et al., "Synthesis of bio-based building blocks From vegetable oils: a platform chemicals approach", Dossier: Chimie Du Végétal Et Lipochimie, OCL vol. 20 Jan.-Feb. 2013.

Jeffsol® Alkylene Carbonates Synthesis of Hydroxyalkyl Urethanes. Huntsman. Technical Bulletin. (2005).

Jeffsol® Propylene Carbonate VOC Exempt Solvent. Huntsman, Technical Bulletin. (2009).

Jeffsol® Alkylene Cabonates Synthesis of Hydroxyalkyl Urethanes. Huntsman, Technical Bulletin. (2003).

Killops et al., "Robust, Efficient, and Orthogonal Synthesis of Dendrimers via Thiol-ene "Click" Chemistry", JACS Communications. vol. 130, 5062-5064. (Published on web Mar. 20, 2008).

Standard Test Method for Hydroxyl Value of Fatty Oils and Acids. ASTM D1957-86 (Reapproved 2001).

Standard Test Method for Acid and Base Number by Color-Indicator Titration. ASTM D974-04. (2004).

An extended European Search Report dated Oct. 17, 2017 in European Patent Application No./Patent No. 15768852.4.

* cited by examiner

# POLYESTER COATING COMPOSITIONS CONTAINING POLYMERS DERIVED FROM CYCLIC CARBONATES

CROSS REFERENCE TO RELATED APPLICATIONS

This application is a national stage filing under 35 U.S.C. § 371 of International Application No. PCT/US2015/023317 filed Mar. 30, 2015, which claims priority under 35 U.S.C. § 119 to U.S. Provisional Application No. 61/971,779 filed Mar. 28, 2014, the disclosures of both of which are incorporated herein by reference.

TECHNICAL FIELD

This invention relates to polyesters, polyester coating compositions and articles coated with such compositions.

BACKGROUND

The application of coatings to metals to retard or inhibit corrosion is well established, especially for metal food and beverage cans and other containers. Coatings are typically applied to the container interior to prevent the contents from contacting the metal of the container. Contact between the metal and the packaged product can lead to corrosion of the metal container, which can contaminate the packaged product. This is particularly true when the product is chemically aggressive. Protective coatings are also applied to the interior of food and beverage containers to prevent corrosion in the container headspace between the product fill line and the container lid, and is of particular importance for high-salt-content food products.

Packaging coatings preferably are capable of high-speed application to a substrate and following hardening preferably meet a variety of requirements for this demanding end use. For example, the coating should be safe for food contact; not adversely affect the taste of the packaged food or beverage product; have excellent adhesion to the substrate; resist staining and other coating defects such as "popping," "blushing" or "blistering"; and resist degradation over long periods of time, even when exposed to harsh environments. In addition, the coating desirably maintains film integrity during container fabrication, withstands the various processing conditions that the container may be subjected to during product packaging, and withstands normal usage of the container (e.g., the coating is capable of maintaining its integrity when the can is dropped from a typical height).

A variety of coating compositions, including polyvinyl-chloride-based coatings, have been used to form interior protective can coatings. However, the recycling of materials containing polyvinyl chloride or related halide-containing vinyl polymers can be problematic.

Bisphenol A and bisphenol F monomers have been used to prepare polymers having a variety of properties useful for packaging. For example, bisphenol A or bisphenol F may be reacted with phosgene to provide polycarbonates that may be used to form packaging containers, and may be reacted with epichlorohydrin to provide packaging coatings. There is a desire to reduce or eliminate the use of certain bisphenol A-based and bisphenol F-based compounds in containers and coatings, and especially those involving contact with foods or beverages. There is also a desire to reduce or eliminate certain epoxy compounds commonly used to formulate food-contact coating compositions.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has been a tradeoff between corrosion resistance and fabrication properties for such coatings. Polyester-based coatings suitable for food contact that have exhibited both good fabrication properties and an absence of crazing have also tended to be too soft and to have unsuitable corrosion resistance. Conversely, polyester-based coatings suitable for food contact that have exhibited good corrosion resistance have typically exhibited poor flexibility and unsuitable crazing when fabricated.

From the foregoing, it will be appreciated that what remains needed in the art are improved coating compositions for use in packaging coatings.

SUMMARY

In one aspect, the present invention provides a coating composition comprising:
(a) a polyester polymer derived by esterifying an aryloxy ether polyol (e.g., an aryloxy ether diol) derived from reaction between:
  (i) a polyhydric phenol or a polyphenol and a non-hydroxyl functional cyclic carbonate, or
  (ii) a monophenol and a hydroxyl functional cyclic carbonate;
(b) a crosslinker and
(c) an optional catalyst.

The aryloxy ether polyol may be esterified by reacting it with a diacid or acid anhydride, or by a transesterification reaction with an ester different from the polyester polymer. In one embodiment, the polyester polymer contains additional aromatic rings (e.g., backbone, pendant or terminal aromatic rings) derived from the diacid, acid anhydride or the different ester.

In one embodiment, the polyhydric phenol is a non-hindered diphenol (e.g., a nonsubstituted diphenol) having low estrogenicity. In another embodiment, the polyphenol is a hindered bisphenol. In yet another embodiment, the monophenol is an alkenyl-substituted monophenol such as cardanol.

In one embodiment, the non-hydroxyl-functional cyclic carbonate is ethylene carbonate, propylene carbonate or butylene carbonate. In another embodiment, the hydroxyl-functional cyclic carbonate is glycerine carbonate.

In another aspect, the invention provides a method for making a polymer or a coating composition. The method includes (a) preparing an aryloxy ether polyol by reacting (i) a polyhydric phenol or a polyphenol and a non-hydroxyl functional cyclic carbonate, or (ii) a monophenol and a hydroxyl functional cyclic carbonate, and (b) preparing a polyester polymer by esterifying the aryloxy ether polyol. The method may further include (c) combining the polyester polymer with a crosslinker and an optional catalyst to form a crosslinkable coating composition.

In another aspect, the invention provides an article coated on at least one surface with the above-described coating composition. In certain embodiments, the coated article comprises a food or beverage can, or a portion thereof, having a body portion (e.g., an interior portion) or an end portion coated with the disclosed coating composition.

In yet another aspect, the invention provides a method for producing a coated article. The method includes providing the above-described coating composition and applying it on a substrate (typically a metal substrate and in some embodiments a planar metal substrate) prior to, during, or after forming the substrate into an article such as food or beverage can or other container or a portion thereof.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list. Other features, objects, and advantages of the invention will be apparent from the description and from the claims.

SELECTED DEFINITIONS

Unless otherwise specified, the following terms as used herein have the meanings provided below.

As used herein, "a," "an," "the," "at least one," and "one or more" are used interchangeably. Thus, for example, a coating composition that comprises "an" additive can be interpreted to mean that the coating composition includes "one or more" additives.

The term "bisphenol" refers to a polyphenol having two phenylene groups that each include a six-carbon ring and a hydroxyl group attached to a carbon atom of the ring, wherein the rings of the two phenylene groups do not share any atoms in common.

The term "comprises" and variations thereof do not have a limiting meaning where these terms appear in the description and claims. The disclosed compositions may in any event comprise, consist essentially of or consist of the recited elements.

The term "crosslinker" refers to a molecule capable of forming a covalent linkage between copolymers (e.g., between polymers) or between two different regions of the same copolymer.

The term "dihydric phenol" refers to a diol having two hydroxyl groups each attached to a carbon atom of a six-carbon ring.

The term "diphenol" may as the context requires refer to a bisphenol or to a dihydric phenol.

The term "easy open end" refers to a can end (typically an end of a food or beverage container) that includes (i) a frangible opening portion (which for some beverage can ends functions as a drinking spout) and (ii) a riveted portion for attaching a pull tab thereto for purposes of opening the frangible opening portion to access the product housed within a can or container.

The term "epoxy-free", when used herein in the context of a polymer, refers to a polymer that does not include any "epoxy backbone segments" (viz., segments formed from reaction of an epoxy group and a group reactive with an epoxy group). By way of example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohydrin (e.g., epichlorohydrin) would not be considered epoxy-free. However, a vinyl polymer formed from vinyl monomers or oligomers that include a pendant epoxy moiety (e.g., glycidyl methacrylate) would be considered epoxy-free because the vinyl polymer would be free of epoxy backbone segments.

The terms "esterified", "esterified" and "esterification" include ester forming reactions (e.g., reaction of a polyol with an acid or acid anhydride) and ester interchange reactions (e.g., transesterification)

The terms "estrogenicity", "estrogenic activity" or "estrogenic agonist activity" refer to the ability of a compound to mimic hormone-like activity through interaction with an endogenous estrogen receptor, typically an endogenous human estrogen receptor.

The term "food-contact surface" refers to a surface of an article (e.g., a food or beverage container) that is in contact with, or suitable for contact with, a food or beverage product. When used in the context of a coating composition applied on a food-contact surface of a packaging article (e.g., a food or beverage container), the term refers to the underlying substrate (typically associated with an interior surface of the packaging article) on which the coating composition is applied, and does not imply that the underlying portion of the substrate will be in contact with a food or beverage product.

The term "mobile" when used in respect to a compound in a cured coating means that the compound can be extracted from the cured coating when a coating (typically ~1 milligram per square centimeter ($mg/cm^2$) or 6.5 $mg/in^2$ thick) is exposed to a test medium for some defined set of conditions, depending on the end use. An example of these testing conditions is exposure of the cured coating to HPLC-grade acetonitrile for 24 hours at 25° C.

The term "monophenol" refers to a compound having one hydroxyl group attached to a carbon atom of a six-carbon ring.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "organic group" means a hydrocarbon group (with optional elements other than carbon and hydrogen, such as oxygen, nitrogen, sulfur, and silicon) that may be further classified as an aliphatic group, cyclic group (e.g., aromatic and cycloaliphatic groups), or combination of aliphatic and cyclic groups (e.g., alkaryl, and aralkyl groups). The term "aliphatic group" means a saturated or unsaturated linear or branched hydrocarbon group. This term is used to encompass alkyl, alkylene, alkenyl, and alkynyl groups, for example. The term "alkyl group" means a saturated monovalent linear or branched hydrocarbon group having for example 1 to 12, 1 to 10 or 1 to 8 carbon atoms (e.g., an n-propyl or isopropyl group), and the term "alkylene group" means a saturated divalent linear or branched hydrocarbon group having for example 1 to 12, 1 to 10 or 1 to 8 carbon atoms (e.g., a propylene group). The term "alkenyl group" means an unsaturated, linear or branched hydrocarbon group with one or more carbon-carbon double bonds (e.g., a vinyl group), and the term "alkynyl group" means an unsaturated, linear or branched hydrocarbon group with one or more carbon-carbon triple bonds (e.g., an ethynyl group). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. A group that may be the same as or different from other groups may be referred to as being "independently" something. Substitution on the organic groups of compounds of the present invention is contemplated. The terms "group" and "moiety" may be used to differentiate between chemical species that allow for substitution or that may be substituted and those that do not allow or may not be so substituted. The term "group" is intended to be a recitation of both the particular moiety, as well as a recitation of the broader class of substituted and unsubstituted structures that include the moiety. Thus, when the term "group" is used to describe a chemical substituent, the described substituent includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, isopropyl, t-butyl, heptyl, dodecyl, octadecyl, amyl, 2-ethylhexyl, and the like, but also alkyl substituents bearing further substituents known in the art, such as hydroxy, alkoxy, alkylsulfonyl, halogen atoms, cyano, nitro, amino, carboxyl, etc. Thus, "alkyl, group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, isopropyl, t-butyl, heptyl, dodecyl, octadecyl, amyl, 2-ethylhexyl, and the like.

Unless otherwise indicated, the term "polymer" includes both homopolymers and copolymers (viz., polymers of two or more different monomers).

The term "polyphenol" refers to a polyhydric material having two or more phenylene groups that each include a six-carbon ring and a hydroxyl group attached to a carbon atom of the ring, wherein the rings of the phenylene groups do not share any atoms in common.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "substantially free" when used with respect to a coating composition that may contain a particular mobile compound means that the coating composition contains less than 1,000 parts per million (ppm) of the recited mobile compound. The term "essentially free" when used with respect to a coating composition that may contain a particular mobile compound means that the coating composition contains less than 100 parts per million (ppm) of the recited mobile compound. The term "essentially completely free" when used with respect to a coating composition that may contain a particular mobile compound means that the coating composition contains less than 5 parts per million (ppm) of the recited mobile compound. The term "completely free" when used with respect to a coating composition that may contain a particular mobile compound means that the coating composition contains less than 20 parts per billion (ppb) of the recited mobile compound. If the aforementioned phrases are used without the term "mobile" (e.g., "substantially free of BPA compound") then the compositions of the present invention contain less than the aforementioned amount of the compound whether the compound is mobile in the coating or bound to a constituent of the coating.

The term "unsaturation" when used in the context of a compound refers to a compound that includes at least one non-aromatic carbon-carbon double or triple bond.

The term "vinyl organosol" means a dispersion of vinyl chloride polymers (preferably high-molecular-weight vinyl chloride polymers) in a liquid carrier.

The recitations herein of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Conventional food-contact, high performance packaging coatings have typically been based on epoxy resins. The presence in such resins of segments derived from diphenols may contribute to their high performance. It would be desirable to prepare high performance packaging coatings from polyesters containing segments derived from diphenols. However, introducing such segments into a polyester backbone is difficult. The presently disclosed coating compositions include polyester polymers having segments derived from diphenols or monophenols in the polyester backbone. The polymers may be made by converting a diphenol or monophenol into an aryloxy ether polyol (preferably an aryloxy ether diol or aryloxy polyether diol) via a ring-opening reaction with a cyclic carbonate (for example, a cyclic alkylene carbonate). The resulting aryloxy ether polyol may be esterified by post-reaction with a diacid or acid anhydride, or esterified via a transesterification reaction with an ester different from the final polyester. The final polyester may for example contain additional aromatic rings (e.g., backbone, pendant or terminal aromatic rings) derived from the diacid, acid anhydride or the different ester. Preferred cured coatings of the invention exhibit a desirable balance of two or more coating properties, for example a desirable balance of two or more of adhesion, corrosion resistance, flexibility and ease of fabrication.

In one embodiment, a dihydric phenol of Formula I is reacted with a non-hydroxyl-functional cyclic carbonate of Formula II to prepare an aryloxy ether diol of Formula III:

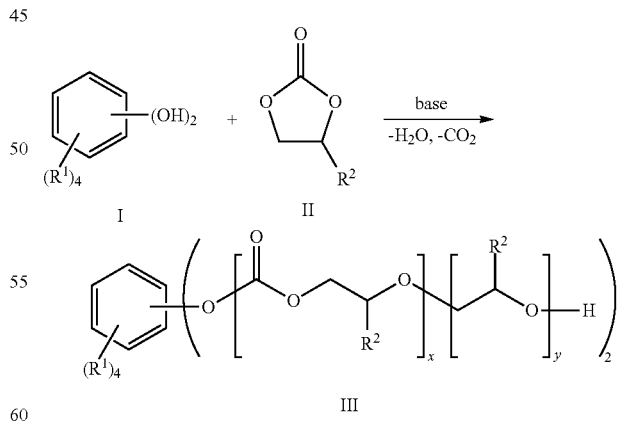

wherein:
each $R^1$ may be the same or different and independently is a monovalent atom (for example, hydrogen or a heteroatom such as a halogen, S or N) or a monovalent organic group (for example, an aliphatic or cycloaliphatic group that may be linear or branched, or an aromatic group) and may contain heteroatoms (for example, O, N or S atoms), with $R^1$ preferably being hydrogen;

$R^2$ is hydrogen (in which case the cyclic carbonate of Formula II is ethylene carbonate) or an organic group (for example, a methyl or ethyl group, in which case the cyclic carbonate of Formula II is respectively propylene carbonate or butylene carbonate)), with $R^2$ preferably being hydrogen;

x is 0 to about 2 and usually is zero or nearly zero; and y is 1 to about 10 and usually is 1 to about 5.

When $R^2$ in Formula II is an alkyl group rather than hydrogen, the aliphatic cyclocarbonate carbon atoms in Formula II may have different reactivities with respect to the phenolate anion derived by removal of a proton from the compound of Formula I, and may result in a mixture of isomeric reaction products. The phenolate anion may also react with the carbonyl carbon atom in Formula II to provide further isomeric reaction products. A variety of structures may accordingly be formed, including for example compounds containing segments of Formulas IV and V shown below:

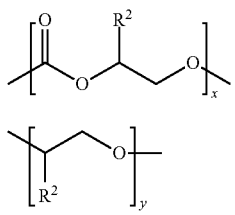

wherein $R^2$, x and y are as defined above. The various formed structures typically will include a terminal primary or secondary alcohol group.

A variety of Formula I dihydric phenols may be employed to make the aryloxy ether polyols of Formula III, including the compounds of Formula VI shown below:

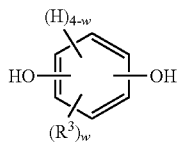

wherein:
  each $R^3$, if present, is preferably independently an atom or group preferably having at atomic weight of at least 15 Daltons;
  w is 0 to 4; and
  two or more $R^3$ groups can optionally join to form one or more cyclic groups (e.g., a divalent cyclic group).

Exemplary dihydric phenol compounds of Formula VI include catechol and substituted catechols (e.g., 3-methylcatechol, 4-methylcatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquinone, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like); and variants and mixtures thereof.

In place of or as part of a mixture with the compounds of Formula I, a variety of bisphenol compounds may instead or also be reacted with a non-hydroxyl-functional cyclic carbonate of Formula II to prepare an aryloxy ether diol of Formula III. Exemplary such bisphenols include those (for example, the bis-4-hydroxybenzoate of cyclohexanedimethanol) described in U.S. Pat. No. 8,129,495 B2 (Evans et al. '495); the bisphenols disclosed in U.S. Patent Application Publication Nos. US 2013/0206756 A1 (Niederst et al. '756) and US 2013/0052381 A1 (Gallucci et al.), and the bisphenols disclosed in International Application No. WO 2013/119686 A1 (Niederst et al. '686), including 2,2'-methylenebis(6-tert-butyl-4-methylphenol) which is available as IONOL™ 46 from Raschig GmbH; 4,4'-methylenebis(2,6-di-tert-butylphenol) which is available as IONOL 220 from Raschig GmbH; 4,4'-butylidenebis[2-tert-butyl-5-methylphenol] which is available as LOWINOX™ 44B25 from Addivant; spirobiindane bisphenols; and bis-(hydroxy phenyl)-N-phenyl isoindolinone. A preferred class of bisphenols include the compounds of Formula IA shown below:

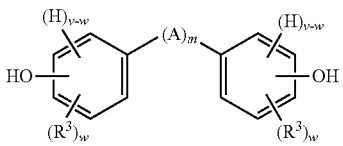

wherein:
  H denotes a hydrogen atom, if present;
  A, if present, is preferably a divalent organic group;
  $R^3$ is as defined above, wherein each of the phenylene rings depicted in Formula IA preferably includes at least one $R^3$ group attached to the phenylene ring at an ortho or meta position relative to the hydroxyl group and wherein two or more $R^3$ groups can join with one another or with the A group to form one or more cyclic groups (e.g., a divalent cyclic group);
  m is 0 or 1, with the proviso that if m is 0, the phenylene rings depicted in Formula IA can optionally join with each other to form a fused ring system (e.g., a substituted naphthalene ring), in which case v is 3 (as opposed to 4) and w is 0 to 3 (as opposed to 0 to 4);
  v is 4; and
  w is as defined above, and preferably is 1 to 4, and more preferably is 2 to 4.

Exemplary compounds of Formula IA include the hindered bisphenols (for example, 4,4'-methylenebis(2,6-dimethylphenol, also known as tetramethyl bisphenol F or TMBPF) described in U.S. Patent Application Publication No. US 2013/0316109 A1 (Niederst et al. '109); and bisphenols (including substituted and nonsubstituted diphenols) having low estrogenicity (for example, 4,4'-(1,4-phenylenebis(propane-2,2-diyl))diphenol and 2,2'methylenebis (phenol)) as also described in Niederst et al. '109.

Exemplary non-hydroxyl-functional cyclic carbonates of Formula II for use in making the compounds of Formula III include ethylene carbonate, propylene carbonate and butylene carbonate, each of which is commercially available as a JEFFSOL™ alkylene carbonate from Huntsman Corporation.

The reaction to make compounds of Formula III preferably employs a catalyst. Suitable catalysts include phosphines, tertiary amines and materials such as those described in U.S. Pat. No. 2,967,892 (Smith); U.S. Pat. No. 2,987,555 (Davis); U.S. Pat. No. 4,261,922 (Kern); U.S. Pat. No. 4,310,706 (Strege '706); U.S. Pat. No. 4,310,707 (Strege '707); U.S. Pat. No. 4,310,708 (Strege et al.); 4,341,905 (Strege '905); U.S. Pat. No. 4,348,314 (Lazarus et al.); U.S. Pat. No. 5,059,723 (Dressler) and U.S. Pat. No. 5,998,568 (Nava). A tertiary amine known as "DBN" (1,5-Diazabicyclo[4.3.0]non-5-ene, CAS No. 3001-72-7) is a preferred catalyst.

To minimize the amount of unreacted Formula I diphenol in the final product, it is desirable to employ an excess, e.g., approximately a 10 to 20% molar excess, of the non-hydroxyl-functional cyclic carbonate of Formula II. The types of and ratio between the Formula I and Formula II reactants and the reaction conditions will also affect the respective amounts of the Formula III bracketed segments bearing the subscripts x and y in the final product. The reaction progress may be monitored using infrared spectroscopy to measure the appearance of carbonate groups or by observing the evolution of $CO_2$ bubbles from the reaction mixture.

In another embodiment, a monophenol of Formula VII is reacted with a hydroxyl-functional cyclic carbonate of Formula VIII to prepare an aryloxy ether polyol of Formula IX:

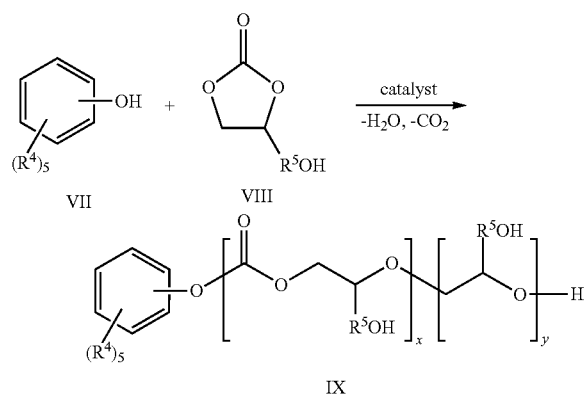

wherein:
each $R^4$ may be the same or different and independently is a monovalent atom (for example, hydrogen or a heteroatom such as a halogen, S or N) or a monovalent organic group (for example, an aliphatic or cycloaliphatic group that may be linear or branched, or an aromatic group) which optionally may contain heteroatoms (for example, O, N or S atoms) or unsaturation, and with one such $R^4$ group preferably being present and the remaining $R^4$ groups preferably being hydrogen;
$R^5$ is an alkylene group (for example, a methylene group, in which case the cyclic carbonate of Formula VII is glycerine carbonate); and
x and y are as defined above.

A mixture of products may be obtained, containing products of Formula IX and products in which the bracketed segments in Formula IX bearing the subscripts x and y are replaced by one or both of the bracketed segments of Formulas X and XI shown below:

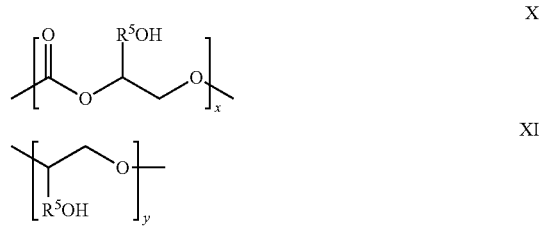

wherein $R^5$, x and y are as defined above.

A variety of Formula VII monophenols may be employed. Exemplary such monophenols include alkenyl-substituted phenols such as cardanol, which is a meta-substituted phenol derived from cashew nut shell liquid. A generalized structure for cardanol is shown below as Formula XII:

wherein:
n corresponds to the number of carbon-carbon double bonds present in the alkenyl side chain and is typically 0, 1, 2 or 3.

When more than one carbon-carbon double bond is present in the meta-positioned alkenyl chain of Formula XII, the carbon-carbon double bonds may be conjugated or non-conjugated. Since cardanol is derived from a naturally occurring feedstock, commercial feedstocks of cardanol may contain variants of the above generalized structure (e.g., compounds having a second hydroxyl group at the "open" meta position) and minor amounts of other compounds. It is contemplated that compounds having the above generalized structure may be reacted on the alkenyl chain without affecting significantly the beneficial reactive properties of the phenolic ring. In addition, the phenolic ring itself may be further substituted, if desired.

Exemplary hydroxyl-functional cyclic carbonates of Formula VIII for use in making the compounds of Formula IX include glycerine carbonate, which is commercially available as a JEFFSOL™ alkylene carbonate from Huntsman Corporation.

The reaction to make compounds of Formula IX preferably employs a catalyst. Suitable catalysts include those described above in connection with making the compounds of Formula III.

To minimize the amount of unreacted Formula VII monophenol in the final product, it is desirable to employ an excess, e.g., approximately a 20 to 30% molar excess, of the hydroxyl-functional cyclic carbonate of Formula VIII. The ratio between the reactants of Formula VII and Formula VIII and the reaction conditions will also affect the respective amounts of the bracketed segments in Formula IX bearing the subscripts x and y, and the respective amounts of compounds containing the bracketed segments of Formula X and XIV, that will be obtained in the final product. The reaction progress may be monitored using infrared spectroscopy to measure the disappearance of carbonate group absorption bands or by observing the evolution of $CO_2$ bubbles from the reaction mixture.

The above-described product compounds of Formula III and Formula IX may be used as is or purified prior to use in a polyester formation reaction. The selected purification method, if used, may depend on factors including the chosen reaction scheme, yield, byproducts and the form (e.g., solid or liquid) in which the product is obtained. Exemplary purification methods will be familiar to persons having ordinary skill in the art and include washing with solvent, solvent extraction, flotation, filtration, centrifugation, evaporation, crystallization, recrystallization, fractionation, electrolysis, sublimation, adsorption, distillation and biological methods including fermentation, microbes and enzymes. Preferably the product compounds of Formula III or Formula IX are liquids, the viscosity and crystallization level of which may depend on the reactants employed. A purification method, if required, may be chosen by taking into account the product physical state and its solubility in various solvents.

The compounds of Formula III and Formula IX may be used to prepare polyester polymers using standard reaction procedures, including a fusion process like that described in U.S. Pat. No. 3,109,834 or an azeotropic distillation process like that described in U.S. Patent Application Publication No. US 2009/0198005 A1. The polyester may be formed by direct esterification or transesterification, with direct esterification being preferred. A compound of Formula III or Formula IX typically is combined with at least one dicarboxylic acid or acid anhydride, and with the optional addition of other di-, tri- or higher-functional polyols and the optional addition of other di-, tri- or higher-functional polycarboxylic acids. Exemplary di- and higher-functional polycarboxylic acids and acid anhydrides include maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, tetrahydrophthalic acid, isophthalic acid, trimellitic acid, terephthalic acid, naphthalene dicarboxylic acids, cyclohexane dicarboxylic acid, glutaric acid, dimer fatty acids, nadic acid, methyl nadic acid, anhydrides of the foregoing (e.g., maleic anhydride, nadic anhydride, etc.) and mixtures thereof. For the sake of brevity, such compounds can be referred to collectively as "carboxylic acids." If desired, adducts of polyacid compounds (e.g., triacids, tetraacids, etc.) and monofunctional compounds may be used. An example of one such adduct is pyromellitic anhydride pre-reacted with benzyl alcohol. Ester derivatives of the foregoing carboxylic acids (e.g., methyl, ethyl or other alkyl esters) and mixtures thereof may be used for transesterification reactions.

Di- and higher-functional polyols may also be present during the esterification reaction. Examples of suitable other di- and higher-functional polyols include ethylene glycol, propylene glycol, 1,3-propanediol, 2-methyl-1,3-propanediol, 2-butyl-2-ethyl-1,3-propanediol, glycerol, diethylene glycol, dipropylene glycol, triethylene glycol, trimethylolpropane, trimethylolethane, tripropylene glycol, neopentyl glycol, pentaerythritol, 1,2-butanediol, 1,3-butanediol, 1,4-butanediol, 1,2-pentanediol, 1,3-pentanediol, 1,4-pentanediol, 2-methyl-2,4-pentanediol, 4-methyl-2,4-pentanediol, 2,2,4-trimethyl 1-3-pentanediol, 1,5-pentanediol, 1,6-hexanediol, 2,2-dimethyl,1,3-hexanediol, cyclohexanedimethanol, a polyethylene or polypropylene glycol, isopropylidene bis (p-phenylene-oxypropanol-2), hydroxypivalyl hydroxypivalate and mixtures thereof. If desired, adducts of polyol compounds (e.g., triols, tetraols, etc.) and monofunctional compounds may be used. An example of one such adduct is dipentaerythritol pre-reacted with benzoic acid.

The polyester polymer may have any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art, and are shown for example in ASTM D 1957-86 (Reapproved 2001) entitled "Standard Test Method for Hydroxyl Value of Fatty Oils and Acids". In some embodiments, the polyester polymer has a hydroxyl number of 0 to about 150, about 10 to about 150, 25 to about 100, or about 30 to about 80.

The polyester polymer may have any suitable acid number. Acid numbers are typically expressed as milligrams of KOH required to titrate a 1 gram sample to a specified end point. Methods for determining acid numbers are well known in the art, and are shown for example in ASTM D 974-04 entitled "Standard Test Method for Acid and Base Number by Color-Indicator Titration". In some embodiments (e.g., when the polyester polymer is intended for use in an organic-solvent based coating composition), the polyester polymer has an acid number of less than about 20, less than about 10, or less than about 5. In other embodiments (e.g., when the polyester polymer is intended for use in a water-based coating composition, the acid number may be appreciably higher (e.g., greater than 20, greater than 50 or greater than 100).

The molecular weight of the polyester polymer may vary depending upon a variety of factors including the chosen raw materials and the desired end use. In some embodiments the polyester polymer has a number average molecular weight (Mn) of at least about 1,000, at least about 1,500, or at least about 3,000. In some embodiments the polyester polymer has an Mn less than about 20,000, less than about 15,000, or less than about 10,000.

The polyester polymer may contain a plurality of segments derived from (viz., obtainable by removal of the hydroxyl hydrogen atoms from) the aryloxy ether polyol. In some embodiments the polyester polymer contains at least about 4 wt. %, at least about 8 wt. % or at least about 10 wt. % such segments, based on the aryloxy ether polyol weight compared to the dry (viz., solvent-free) polyester polymer weight. In some embodiments the polyester polymer contain less than about 50 wt. %, less than about 40 wt. % or less than about 35 wt. % such segments, based on the aryloxy ether polyol weight compared to the dry polyester polymer weight.

The polyester polymer may contain segments derived from long chain length oils, but desirably is sufficiently free of such oil segments so as to be suitable for use in a packaging coating. In some embodiments the polyester polymer is derived from less than 15 wt. % oils having 15 or more carbon atoms, based on the oil weight compared to the dry polyester polymer weight.

The polyester polymer may contain aromaticity derived from the above-mentioned polyhydric phenol, polyphenol, diacid, acid anhydride or ester different from the polyester polymer. The amount of aromatic ring content may for example be like the aromatic ring content amounts present in conventional BPA-epoxy-derived packaging coatings, such as DGEBPA packaging coatings derived from the diglycidyl ether of bisphenol A. In some embodiments the disclosed polyester polymer contains at least about 5 wt. %, at least about 10 wt. % or at least about 15 wt. % aromatic ring segments, based on the weight of aromatic ring carbon atoms compared to the dry polyester polymer weight. In some embodiments the polyester polymer contain less than about 50 wt. %, less than about 40 wt. % or less than about 30 wt. % aromatic ring segments, based on the weight of aromatic ring carbon atoms compared to the dry polyester polymer weight.

The polyester polymer may have any suitable glass transition temperature (Tg). In some embodiments the polyester polymer has a Tg of at least 0° C., at least 5° C., or at least 10° C. In embodiments in which the polyester polymer is intended for use in an internal food or beverage can coating, it may be desirable that the polyester polymer have a Tg of at least 30° C., at least 40° C., or at least 50° C. In some embodiments, the polyester polymer has a Tg less than 100° C., less than 80° C., or less than 60° C. The aforementioned Tg values are with respect to the polyester polymer prior to cure of the coating composition.

The disclosed coating compositions may include any suitable amount of the polyester polymer to produce the desired result. In some embodiments, the coating compositions include at least about 10, at least about 15, or at least about 20 wt. % polyester polymer, based on the total nonvolatile weight of the coating composition. In some embodiments, the coating compositions include less than about 90, less than about 85, or less than about 80 wt. % polyester polymer, based on the total nonvolatile weight of the coating composition.

The polyester polymer may be made water dispersible or water soluble using a variety of techniques. For example, the polyester polymer may be modified to contain a suitable amount of salt-containing or salt-forming groups to facilitate preparation of an aqueous dispersion or solution. Suitable salt-forming groups may include neutralizable groups such as acidic or basic groups. At least a portion of the salt-forming groups may be neutralized to form salt groups useful for dispersing the polyester polymer into an aqueous carrier. Acidic or basic salt-forming groups may be introduced into the polyester polymer by any suitable method. For example, carboxylic acid groups may be introduced into a hydroxyl group-containing polyester polymer via reaction with a polyanhydride such as tetrahydrophthalic anhydride, pyromellitic anhydride, succinic anhydride, trimellitic anhydride ("TMA") or mixture thereof. In one embodiment, a polyester polymer or oligomer having one or more pendant and preferably terminal hydroxyl groups is reacted with an anhydride such as TMA to produce a carboxyl-functional polyester polymer or oligomer. The conditions of the reaction, including the temperature, are desirably controlled to avoid gelling. The carboxylic-functional polyester polymer or oligomer is neutralized (e.g., using a base such as a tertiary amine) to form salt groups and an aqueous dispersion. In embodiments in which the polyester polymer includes unsaturation in the polymer backbone or in a pendant group, water dispersibility may be provided by grafting an acid-functional ethylenically unsaturated monomer or an acrylic polymer onto the polyester to form a partly-grafted polyester-acrylic copolymer. Exemplary polyester polymers containing such unsaturation include compounds of Formula IX made from an alkenyl-substituted phenol such as cardanol, and polyester polymers made using unsaturated acids or acid anhydrides such as fumaric acid, maleic anhydride or nadic anhydride. All or a suitable number of the acid-functional groups in the resulting polyester-acrylic copolymer may be neutralized with a base (for example, a tertiary amine) to form salt groups and an aqueous dispersion. Further information regarding such techniques may be found, for example in U.S. Patent Application Publication No. US 2005/0196629 A1.

The disclosed polyester polymers and coating compositions preferably are substantially free, more preferably essentially free, even more preferably essentially completely free, and optimally completely free of mobile bisphenol A (BPA) and aromatic glycidyl ether compounds. Exemplary such aromatic glycidyl ether compounds include diglycidyl ethers of bisphenol (BADGE), diglycidyl ethers of bisphenol F (BFDGE) and epoxy novalacs. In some embodiments, the disclosed polyester polymers and coating composition are preferably substantially free, more preferably essentially free, even more preferably essentially completely free, and optimally completely free of bound BPA and aromatic glycidyl ether compounds including BADGE, BFDGE and epoxy novalacs. The disclosed polyester polymers and coating compositions preferably are also at least substantially "epoxy-free" and more preferably "epoxy-free."

A variety of crosslinkers may be used in the disclosed coating compositions. Exemplary crosslinkers include phenolic crosslinkers. (e.g., phenoplasts), including novolac- and resole-type resins; amino crosslinkers (e.g., aminoplasts); blocked isocyanate crosslinkers; materials containing oxirane groups (e.g., oxirane-functional polyesters such as glycidol-modified polyesters or oxirane-functional vinyl polymers such as acrylic resins formed using glycidyl methacrylate) and combinations thereof. Further information regarding glycidol-modified polyesters may be found in U.S. Patent Application Publication No. US 2012/0125800 A1. Preferred crosslinkers are at least substantially free, more preferably completely free, of bound BPA and aromatic glycidyl ethers. Resole phenolic crosslinkers are preferred. The crosslinker concentration may vary depending upon the desired result. For example, in some embodiments, the coating composition may contain from about 0.01 wt. % to about 40 wt. %, about 0.5 wt. % to about 35 wt. %, or about 3 wt. % to about 30 wt. % crosslinker(s) based on the total weight of nonvolatile materials in the coating composition. In other embodiments, the coating composition may contain at least about 5, at least about 10, or at least about 15 wt. % crosslinker(s) based on the total weight of nonvolatile materials in the coating composition.

Examples of suitable phenolic crosslinkers include the reaction products of aldehydes with phenols. Formaldehyde and acetaldehyde are preferred aldehydes. Examples of suitable phenols include phenol, cresol, p-phenyphenol, p-tert-butylphenol, p-tert-amylphenol, cyclopentylphenol, cresylic acid, BPA (not presently preferred), and combinations thereof. Exemplary resole phenolic crosslinkers include DUREZ™ 33160 and 33162 (each available from Durez Corporation), BAKELITE™ 6535 and 6470 (each available from Hexion Specialty Chemicals GmbH), PHE-NODUR™ PR 285 and PR 812 (each available from Cytec Surface Specialties), SFC™ 112 and 142 (each available from the SI Group) and mixtures thereof.

Amino crosslinker resins are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof. Condensation products of other amines and amides can also be employed such as, for example, aldehyde condensates of triazines, diazines, triazoles, guanadines, guanamines and alkyl- and aryl-substituted melamines. Exemplary such compounds include N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof. Exemplary commercially available amino cross-linking resins include CYMEL™ 301, CYMEL 303, CYMEL 370, CYMEL 373, CYMEL 1131, CYMEL 1125, CYMEL 5010 and MAPRENAL™ MF 980 (all available from Cytec Industries Inc.) and URAMEX™ BF 892 (available from DSM).

An optional catalyst may be employed to increase the rate of cure or the extent of crosslinking. Suitable catalysts include those known for use in crosslinking resole type phenolic resins or for use in the electrophilic substitution of aromatic rings. Exemplary such catalysts include strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), triflic acid, phosphoric acid, vinyl phosphonic acid-modified acrylic resins, and mixtures thereof. If used, a catalyst may for example be present in an amount of at least 0.01 wt. % or, at least 0.1 wt. % based on the weight of nonvolatile material. If used, a catalyst is preferably present in an amount no greater than 3 wt. % or no greater than 1 wt. %, based on the total weight of nonvolatile material.

If desired, the disclosed coating compositions may optionally include other additives that do not adversely affect the coating composition or a cured coating resulting therefrom. The optional additives are preferably at least substantially free of mobile or bound BPA and aromatic glycidyl ether compounds (e.g., BADGE, BFDGE and epoxy novalac compounds) and are more preferably completely free of such compounds. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be employed include carriers, additional polymers, emulsifiers, pigments, metal powders or pastes, fillers, anti-migration aids, antimicrobials, extenders, curing agents, lubricants, coalescents, wetting agents, biocides, plasticizers, crosslinking agents, antifoaming agents, colorants, waxes, antioxidants, anticorrosion agents, flow control agents, thixotropic agents, dispersants, adhesion promoters, UV stabilizers, scavenger agents or combinations thereof. Each optional ingredient can be included in a sufficient amount to serve its intended purpose, but preferably not in such an amount to adversely affect the coating composition or a cured coating resulting therefrom.

A variety of carriers may be employed in the disclosed coating compositions. Exemplary such carriers include carrier liquids such as organic solvents, water, and mixtures thereof. Exemplary organic solvents include aliphatic hydrocarbons (e.g. mineral spirits, kerosene, high flashpoint VM&P naptha, and the like); aromatic hydrocarbons (e.g. benzene, toluene, xylene, solvent naphtha 100, 150, 200 and the like); alcohols (e.g. ethanol. n-propanol, isopropanol, n-butanol, iso-butanol and the like); ketones (e.g. acetone, 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol), glycol ethers (e.g. ethylene glycol monomethyl ether, ethylene glycol monoethyl ether, ethylene glycol monobutyl ether, propylene glycol monomethyl ether, and the like); glycol esters (e.g. butyl glycol acetate, methoxypropyl acetate and the like); and mixtures thereof. Preferably, the liquid carrier(s) are selected to provide a dispersion or solution of the disclosed polyester polymer for further formulation. In some embodiments the disclosed coating composition includes at least about 20, more preferably at least about 30, and even more preferably at least about 35 wt. % carrier, based on the total weight of the coating composition. In some embodiments the disclosed coating composition includes less than about 90, more preferably less than about 80, and even more preferably less than about 70 wt. % carrier, based on the total weight of the coating composition In some embodiments, the disclosed coating composition is a water-based varnish. In some such embodiments, preferably at least about 50 wt. % of the liquid carrier system is water, more preferably about 60 wt. % is water, and even more preferably about 75 wt. % is water. Some such embodiments include at least about 10 wt. % of water, more preferably at least about 20 wt. % of water, and even more preferably at least about 40 wt. % or at least about 50 wt. % of water, based on the total weight of the coating composition.

The disclosed coating compositions may be prepared by conventional methods in various ways. For example, the coating compositions may be prepared by simply admixing the polyester polymer, crosslinker and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, the polyester polymer, crosslinker, optional catalyst, and any other optional ingredients, in any desired order, with sufficient agitation. An additional amount of carrier liquid may be added to the coating compositions to adjust the amount of nonvolatile material in the coating composition to a desired level.

The total amount of solids present in the disclosed coating compositions may vary depending upon a variety of factors including, for example, the desired method of application. Presently preferred coating compositions include at least about 10, more preferably at least about 20, and even more preferably at least about 30 wt. % solids, based on the total weight of the coating composition. Preferably, the coating compositions include less than about 80, more preferably less than about 70, and even more preferably less than about 65 wt. % solids, based on the total weight of the coating composition.

In another embodiment, the invention provides a coating composition that includes the disclosed polyester polymer in combination with an optional thermoplastic dispersion and crosslinker. Such coating compositions may be suitable for various applications including food or beverage packaging applications. While not intending to be bound by any theory, it is believed that some of the disclosed polyester polymers are capable of stabilizing certain thermoplastic materials such as, for example, polyvinyl chloride ("PVC") to prevent or decrease degradation of the thermoplastic material or a cured coating resulting therefrom. Thus, it is within the scope of this invention to include an efficacious amount of the disclosed polyester polymer (e.g., for purposes of stabilizing the thermoplastic dispersion) in an organosol or plastisol coating composition. Organosols useful in the compositions of the invention, include, for example, vinyl organosols. A discussion of suitable materials and preparation methods for such compositions may be found, for example, in U.S. Pat. No. 8,481,645 B2 (Payot et al.). Organosol coating compositions may for example include at least about 10, at least about 15 or at least about 20 wt. % of the disclosed polyester polymer, based on the total nonvolatile weight of the coating composition. Organosol coating compositions may for example include less than about 90, less than about 70 or less than about 60 wt. % polyester polymer, based on the total nonvolatile weight of the coating composition. Organosol coating compositions may also include at least about 10, at least about 15 or at least about 20 wt. % thermoplastic material, based on the total nonvolatile weight of the coating composition. The organosol coating compositions may also include less than about 80, less than about 70, or less than about 65 wt. % of thermoplastic material, based on the total nonvolatile weight of the coating composition.

Exemplary thermoplastic materials include halogenated polyolefins, such as copolymers and homopolymers of vinyl chloride, vinylidenefluoride, polychloroprene, polychloroisoprene, polychlorobutylene, and combinations thereof. PVC is a particularly preferred thermoplastic material. The thermoplastic material may for example have an Mn of from about 40,000 to about 300,000; from about 75,000 to about 200,000; or from about 100,000 to about 150,000. In applications involving packaging coatings, dispersion grade thermoplastic particles are preferred, where the particles range in size from greater than 0 to about 5 microns, based on volume-average median particle diameter. Other sizes may however be used, such as non-dispersion grade thermoplastic particles that range in size from about 5 to about 100 microns, based on volume-average median particle diameter.

The thermoplastic material is preferably dispersed in a liquid carrier to form a thermoplastic dispersion. Examples of suitable liquid carriers include an organic solvent, a plasticizer, or mixtures thereof. Suitable organic solvents may include polar solvents such as ketones (e.g., MIBK and DIBK), glycol ethers, alcohols, aliphatic hydrocarbons, aromatic hydrocarbons, or mixtures thereof. In some embodiments, it may be advantageous to choose a solvent that has an affinity to the thermoplastic material or one that can swell the thermoplastic particles to facilitate storage stability of the liquid coating composition. Preferred liquid carriers exhibit sufficient volatility to substantially evaporate from the coating composition during the curing process.

Cured coatings of the invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to products such as food or beverage products. The coatings may be applied to any suitable surface, including inside surfaces of containers, outside surfaces of containers, container ends, and combinations thereof.

The disclosed coating composition can be applied to a substrate in liquid form or in solid form using any suitable procedure such as spray coating, roll coating, coil coating, curtain coating, immersion coating, meniscus coating, kiss coating, blade coating, knife coating, dip coating, slot coating, slide coating, powder coating and other premetered or otherwise controllable coating techniques. In one embodiment where the coating is used to coat metal sheets or coils, the coating can be applied by roll coating.

The coating composition can be applied on a substrate prior to, during (for example, by spraying the coating composition into a partially-formed container) or after forming the substrate into an article. In some embodiments, at least a portion of a planar substrate is coated with one or more layers of the disclosed coating composition, which is then cured before the substrate is formed into an article.

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely uncrosslinked state. The coated substrate can then be heated to fully cure the coating composition. In certain instances, the coating composition can be dried and cured in one step. In preferred embodiments, the disclosed coating composition is a heat-curable coating composition.

The curing process may be performed at any suitable temperature, including, for example, temperatures in the range of about 180° C. to about 250° C. If the substrate to be coated is a metal coil, curing of the applied coating composition may be conducted, for example, by subjecting the coated metal to a temperature of about 230° C. to about 250° C. for about 15 to 30 seconds. If the substrate to be coated is metal sheeting (e.g., such as used to make three-piece food cans), curing of the applied coating composition may be conducted, for example, by subjecting the coated metal to a temperature of about 190° C. to about 210° C. for about 8 to about 12 minutes.

The disclosed coating compositions may be useful in a variety of coating applications. The coating compositions are particularly useful as adherent coatings on interior or exterior surfaces of metal containers. Examples of such articles include closures (including for example internal surfaces of twist off caps for food and beverage containers); internal crowns; two- and three-piece cans (including for example food and beverage containers); shallow drawn cans; deep drawn cans (including for example multi-stage draw and redraw food cans); can ends (including for example easy open food or beverage can ends); monobloc aerosol containers; and general industrial containers, cans, and can ends.

Preferred coating compositions are particularly suited for use on interior or exterior surfaces of metal food or beverage containers, including food-contact surfaces. Preferably, the cured coatings are retortable when employed in food and beverage container applications. Preferred cured coatings are capable of withstanding elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Examples of such aggressive food or beverage products may include meat-based products, milk-based products, acidic fruit-based products, energy drinks, and acidic or acidified products.

The disclosed coating composition is particularly suitable for use as a coating on the food-contact surface of the sidewall of a three-piece food can. The coating composition is typically applied to a metal sheet which is then typically cured prior to fabricating the coated sheet into the sidewall of a three-piece food can.

Test Methods

The disclosed coating compositions may be evaluated using a variety of test methods, including:

A. Solvent Resistance Test

The extent of "cure" or crosslinking of a coating is measured as a resistance to solvents, such as methyl ethyl ketone (MEK) or isopropyl alcohol (IPA). This test is performed as described in ASTM D 5402-93. The number of double rubs (viz., one back-and-forth motion) is reported. Preferably, the MEK solvent resistance is at least 30 double rubs.

B. Adhesion Test

Adhesion testing may be performed to assess whether the coating compositions adhere to the coated substrate. This test is performed according to ASTM D 3359—Test Method B, using SCOTCH™ 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

C. Blush Resistance Test

Blush resistance measures the ability of a coating to resist attack by various solutions. Typically, blush is measured by the amount of water absorbed into a coated film. When the film absorbs water, it generally becomes cloudy or looks white. Blush may be measured visually using a scale of 0-5 where a rating of "0" indicates no blush, a rating of "1" indicates slight whitening of the film, and a rating of "3" indicates whitening of the film, and so on. Blush ratings of "2" or less are typically desired for commercial packaging coatings and optimally "1" or less.

D1. Process or Retort Resistance Test

This is a measure of the coating integrity of a coated substrate after exposure to heat and pressure with a liquid such as water. Retort performance is not necessarily required for all food and beverage coatings, but is desirable for some product types that are packed under retort conditions. The procedure is similar to a Sterilization or Pasteurization Test. Testing is accomplished by subjecting the substrate to heat ranging from 105-130° C. and pressure ranging from 0.7 kg/cm$^2$ to 1.05 kg/cm$^2$ for a period of 15 to 90 minutes. The coated substrate is then tested for adhesion and blush as described above. In food or beverage applications requiring retort performance, adhesion ratings of 10 and blush ratings of at least 7 are typically desired for commercially viable coatings.

D2. Retort Method

This test provides an indication of an ability of a coating to withstand conditions frequently associated with food or beverage preservation or sterilization. Coated ETP flat panels may be placed in a vessel and partially immersed in a test substance. While totally immersed in the test substance, the coated substrate samples are placed in an autoclave and subjected to heat of 130° C. and pressure of 1 atmosphere above atmospheric pressure for a time period of 60 minutes. Just after retort, the coated substrate samples are tested for adhesion, blush resistance, or stain resistance.

E. Wedge Bend Test

This test provides an indication of a level of flexibility of a coating and its extent of cure. Test wedges are formed from coated 12 cm long by 5 cm wide rectangular metal test sheets. Test wedges are formed from the coated sheets by folding (viz., bending) the sheets around a mandrel. To accomplish this, the mandrel is positioned on the coated sheets so that it is oriented parallel to, and equidistant from, the 12 cm edges of the sheets. The resulting test wedges have a 6 mm wedge diameter and a length of 12 cm. To assess the wedge bend properties of the coatings, the test wedges are positioned lengthwise in a metal block of a wedge bend tester and a 2.4 kg weight is dropped onto the test wedges from a height of 60 cm. The deformed test wedges are then immersed in a copper sulphate test solution (prepared by combining 20 parts of $CuSO_4.5H_2O$, 70 parts of deionized water, and 10 parts of hydrochloric acid (36%)) for about 2 minutes. The exposed metal is examined under a microscope and the millimeters of coating failure along the deformation axis of the test wedges is measured. The results may be expressed as a wedge bend percentage using the following calculation:

$$100\% \times [(120 \text{ mm})\sim(\text{mm of failure})]/(120 \text{ mm}).$$

A coating is considered to satisfy the Wedge Bend Test if it exhibits a wedge bend percentage of 70% or more.

The invention is illustrated by the following examples. It is to be understood that the particular examples, materials, amounts, and procedures are merely illustrative and that other embodiments may be made as described. Unless otherwise indicated, all parts and percentages are by weight.

EXAMPLES

Example 1

Reaction of Tetramethyl Bisphenol F with Ethylene Carbonate 4,4'-Methylenebis(2,6-dimethylphenol) and a 10% molar excess of ethylene carbonate were combined in a reaction vessel and heated to 100° C. 0.1 Wt. % 1,5-Diazabicyclo[4.3.0]non-5-ene (DBN) based on the weight of reactants was added to the vessel to catalyze the reaction. The reaction vessel was held at 150° C. for one hour and then at 180° C. until the carbonate infrared absorption bands disappeared after about 4 hours. The product, a diol of Formula III, contained 0.14 wt. % unreacted 4,4'-Methylenebis(2,6-dimethylphenol) and 3.6 wt. % unreacted ethylene carbonate.

Example 2

Reaction of Cardanol with Glycerine Carbonate

Cardanol and a 20% molar excess of glycerine carbonate were combined in a reaction vessel and heated to 120° C. 0.1 Wt. % DBN based on the weight of reactants was added to the vessel to catalyze the reaction. The reaction vessel was held at 180° C. for 4 to 5 hours until the reaction was complete as monitored by infrared spectroscopy and the cessation of $CO_2$ bubble formation. The product, a diol of Formula IX, contained 1.23 wt. % unreacted cardanol and less than 0.02 wt. % unreacted glycerine carbonate.

Example 3

Reaction of Tetramethyl Bisphenol F with Propylene Carbonate

Using the method of Example 1, 4,4'-Methylenebis(2,6-dimethylphenol) and a 10% molar excess of propylene carbonate were combined in a reaction vessel and heated to 120° C. 0.1 Wt. % DBN based on the weight of reactants was added to the vessel to catalyze the reaction. The reaction vessel was held at 180° C. for 5 hours until the reaction was complete as monitored by infrared spectroscopy and the cessation of $CO_2$ bubble formation. The product, a diol of Formula III, contained 0.02 wt. % unreacted 4,4'-Methylenebis(2,6-dimethylphenol) and 4.2 wt. % unreacted propylene carbonate.

Example 4

Reaction of 2,2'-methylenebis(6-tert-butyl-4-methylphenol) with Ethylene Carbonate Using the method of Example 1, IONOL 46 (2,2'-methylenebis(6-tert-butyl-4-methylphenol)) and a 10% molar excess of ethylene carbonate were combined in a reaction vessel and heated to 120° C.. 0.1 wt. % DBN was added to the vessel to catalyze the reaction. The reaction vessel was held at 180° C. for 5 hours until the reaction was complete as monitored by infrared spectroscopy and the cessation of $CO_2$ bubble formation. The product was a diol of Formula III.

Example 5

Polyester Synthesis Using Formula III Diol

The Formula III diol prepared in Example 1 was used to make a solvent-borne polyester polymer containing segments of Formula XIII shown below:

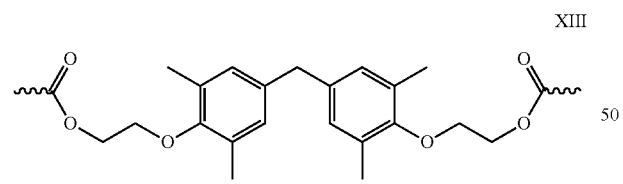

XIII

The reaction was performed by mixing 12.25 g neopentyl glycol, 2.52 g ethylene glycol, 10.69 g cyclohexanedimethanol, 33.1 g of the Example 1 diol, 35.66 g isophthalic acid, 12.76 g cyclohexane dicarboxylic acid, 1.12 g maleic anhydride and 0.09 g organometallic catalyst in a reaction vessel equipped with an overhead stirrer, heating mantle, packed column with Raschig rings, distilling head and condenser. The reaction mixture was heated to and maintained at 240° C. until an acid value of 20 was obtained. Next, 2.66 g sebacic acid and 8.7 g xylene were added to the reaction vessel, the packed column and distilling head were replaced by a Dean-Stark trap, and the reaction mixture was heated to reflux until an acid value of 5 was obtained. The reaction mixture was cooled and diluted with 34.2 g butyl glycol to provide the finished polyester solution.

Example 6

Polyester Synthesis Using Formula IX Diol

The Formula IX diol prepared in Example 2 was used to make a solvent-borne polyester polymer containing segments of Formula XIV shown below:

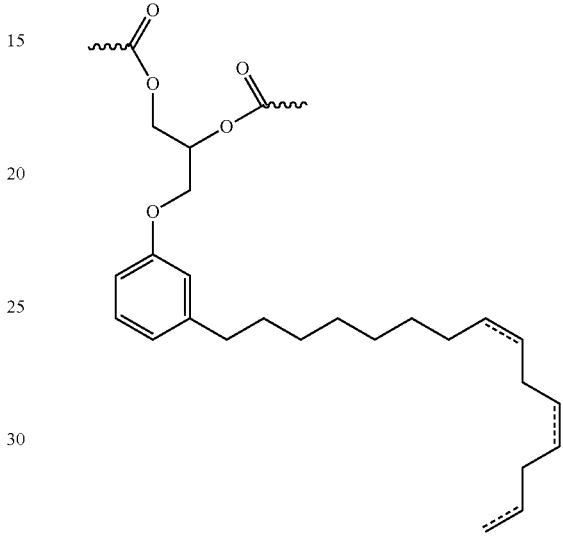

XIV

The reaction was performed by mixing 10.78 g neopentyl glycol, 2.21 g ethylene glycol, 18.11 g cyclohexanedimethanol, 20.04 g of the Example 2 diol, 36.44 g isophthalic acid, 12.42 g cyclohexane dicarboxylic acid and 0.09 g organometallic catalyst in a reaction vessel equipped with an overhead stirrer, heating mantle, packed column with Raschig rings, distilling head and condenser. The reaction mixture was heated to and maintained at 230° C. until an acid value of 20 was obtained. Next, 5.3 g xylene was added to the reaction vessel, the packed column and distilling head were replaced by a Dean-Stark trap, and the reaction mixture was heated to reflux until an acid value of 5 was obtained. The reaction mixture was cooled and diluted with 37.6 g butyl glycol to provide the finished polyester solution.

Example 7

Acrylated Polyester Synthesis Using Formula III Diol

The Formula III diol prepared in Example 1 was used to make a water-based acrylated polyester by heating at 130° C. 70 g (dry basis) of the Example 5 polyester, 23.94 g butyl glycol and 1.609 g Xylene and adding over the course of 2 hours a 130° C. heated monomer feed containing 1.2 parts 2,2'-Azodi(2-methylbutyronitrile) (AMBN) initiator, 14 g ethyl acrylate, 5.89 g styrene, 4.24 g acrylic acid and 5.89 g hydroxyethyl acrylate. One hour after the end of the heated monomer feed, the reaction mixture was spiked with 0.16 g tert-butyl peroxybenzoate initiator (TBPB). The reaction mixture was maintained at 130° C. for about two hours until the measured nonvolatile content (NVC) reached 70%. A 0.5 g portion of the reaction product was heated at 180° C. for 1 hour and determined to have an acid value of 32.5 and a 70.1 NVC. The remaining reaction product was cooled to 97° C. and the acid content fully neutralized by adding a 50% by weight solution of dimethylethanolamine (DMEA) in water over a 10 minute period. The resulting product was held at 97° C. for a 30 minute period, the diluted with hot water added over the course of one hour until the NVC reached 30%. The final product characteristics were: NVC=29.5%, viscosity 43 seconds at 25° C. using a No. 4 Afnor viscosity flow cup, and pH=8.5.

Example 8

Acrylated Polyester Synthesis Using Formula IX Diol

The Formula IX diol prepared in Example 2 was used to make a water-based acrylated polyester by heating at 130° C. 70 parts (dry basis) of the Example 6 polyester, 26.3 g butyl glycol and 3.7 g xylene and adding over two hours at 130° C. a heated monomer feed containing a mixture of 1.2 parts AMBN, 12.42 parts ethyl acrylate, 5.89 g styrene, 5.79 g acrylic acid and 5.89 g hydroxyethyl acrylate to provide an acrylated polyester containing 70% NVC. One hour after addition of the heated monomer feed, the reaction mixture was spiked with 0.16 g TBPB, then held for two hours at 130° C. and spiked again with 0.16 g TBPB. The reaction mixture was maintained at 130° C. for about one hour until the NVC reached 70%. A 1 g portion of the reaction product was heated at 180° C. for 30 minutes and determined to have an acid value of 43.5 and a 70% NVC. The remaining reaction product was cooled to 97° C. and the acid content fully neutralized by adding a 50% by weight solution of DMEA in water over a 10 minute period. The resulting product was held at 97° C. for a 30 minute period, the diluted with hot water added over the course of one hour until the NVC reached 28%. The final product characteristics were: NVC=27.3%, viscosity 136 seconds at 25° C. using a No. 4 Afnor viscosity flow cup, and pH=8.8.

Example 9

Solvent-Based Coating Formulations

To the polyester solutions of Examples 5 and 6 were added with stirring a resole-type phenolic resin and an acidic catalyst. The solution viscosities were adjusted using a xylene-butanol solvent blend. After complete homogenization the coating compositions were allowed to stand for 12 hours at room temperature, then applied at a 6-8 g/m² dry film weight on tinplate panels bearing a 2.8 g/m² tin film weight coating and cured for 10 minutes at 200° C. (time at peak metal temperature). After cooling, some of the coated panels were drawn in order to produce a 4 cornered asymmetrical box or regular ends. The boxes, ends and flat panels were then retorted for one hour at 130° C. in water, water+ 3% acetic acid or water+1% sodium chloride. The appearance, adhesion and flexibility of the coated panels was evaluated using a 0-5 scale by comparing the coated panels to a reference series of standard coated panels. The coating recipes are set out below in Table 1 and the evaluation results are set out below in Table 2:

TABLE 1

Coating Recipes

| Ingredient | Coating 1 | Coating 2 |
|---|---|---|
| Example 5 Polyester (55% NVC) | 59 | |
| Example 6 Polyester (70% NVC) | | 47 |
| Resole Type Phenolic resin (60% NVC in Butanol) | 12 | 12 |
| Sulfonic acid catalyst (5% in DOWANOL ™ DPM) | 2 | |
| Phosphoric acid catalyst (10% in DOWANOL DPM) | | 0.5 |
| Xylene | 16 | 29 |
| Butanol | 4 | 4 |

TABLE 2

Evaluation (scale 0-5, 5 = the best)

| Test Panel | Coating 1 | Coating 2 |
|---|---|---|
| 4c box retorted in 3% acetic acid | 4 (slight blush and bubbling) | Loss of adhesion on 3 corners |
| 4c box retorted in water | 5 (no blush, no bubbling) | Loss of adhesion on 3 corners |
| 4c box retorted in 1% salt water | 5 (no blush, no bubbling) | Loss of adhesion on 3 corners |
| Flat panels retorted in 3% acetic acid | 4 (slight blush, very slight bubbling) | 4 (slight blush, no blistering) |
| Flat panels retorted in 1% salt water | 4.5 (very slight blush, no bubbling) | 5 (no blush, excellent adhesion, no blistering) |
| Flat panels retorted in water | 5 (no blush, no bubbling) | 5 (no blush, excellent adhesion) |

Example 10

Water-Based Coating Formulations

The polyester of Example 8 was employed at two different solids levels and stirred together with two different resole-type phenolic resins, an amine-neutralized sulfonic acid catalyst, and a vinyl phosphonic acid acrylic resin that had been neutralized with amine in order to make the resin water soluble. The acrylic resin serves as both an adhesion promoter and crosslinking catalyst. The coating composition viscosities were adjusted with deionized water to a target of about 60 seconds at 25° C. using a No. 4 Afnor viscosity flow cup. After complete homogenization the coating compositions were allowed to stand for 12 hours at room temperature, then applied at a 6-8 g/m² dry film weight on tinplate panels like those used in Example 9 and cured for 4 or 10 minutes at 200° C. (total oven time). After cooling the coated panels were drawn to produce regular ends and retorted and evaluated as in Example 9. The coating recipes are set out below in Table 3 and the evaluation results are set out below in Table 4:

TABLE 3

Coating Recipes

| Ingredient | Coating 3 | Coating 4 |
|---|---|---|
| Example 8 Polyester (30% NVC) | 69 | |
| Example 8 Polyester (27% NVC) | | 50 |

TABLE 3-continued

| Coating Recipes | | |
|---|---|---|
| Ingredient | Coating 3 | Coating 4 |
| Resole Type Phenolic resin 1 | 3 | |
| Resole Type Phenolic resin 2 | | 5 |
| Amine-neutralized sulfonic acid catalyst | 5 | 2 |
| Amine-neutralized vinyl phosphonic acid acrylic resin | 4 | 4.8 |
| Water | To adjust viscosity | To adjust viscosity |

TABLE 4

| Evaluation (scale 0-5, 5 = the best) | | | | |
|---|---|---|---|---|
| Test Panel | Coating 3 4 min 200° C. | Coating 3 10 min 200° C. | Coating 4 4 min 200° C. | Coating 4 10 min 200° C. |
| Ends retorted in water | 5 (no blush, excellent adhesion) | | 5 (no blush, excellent adhesion) | |
| Ends retorted in 3% acetic acid | 4 (slight blush, excellent adhesion) | 4.5 (slight blush, excellent adhesion) | 4.5 (slight blush, excellent adhesion) | 5 (no blush, excellent adhesion) |
| Ends retorted in 1% salt water | 5 (no blush, excellent adhesion) | | 5 (no blush, excellent adhesion) | |

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A coating composition comprising:
    (a) a polyester polymer derived by esterifying an aryloxy ether polyol derived from reaction between ingredients including a dihydric phenol and a non-hydroxyl functional cyclic carbonate to provide a diol having Formula III:

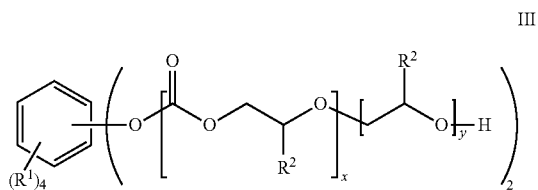

wherein:
        each $R^1$ may be the same or different and independently is a monovalent atom or a monovalent organic group and may contain heteroatoms, and wherein at least one $R^1$ is an organic group having an atomic weight of at least 15 Daltons;
        $R^2$ is hydrogen or an organic group;
        x is nearly 0 to about 2; and
        y is 1 to about 10;
    (b) a crosslinker; and
    (c) an optional catalyst.

2. A coating composition according to claim 1, wherein the aryloxy ether polyol is a diol derived from reaction between a dihydric phenol and a non-hydroxyl functional cyclic carbonate having Formula II:

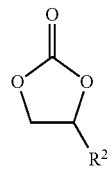

wherein $R^2$ is hydrogen or an alkyl group.

3. A coating composition according to claim 1, wherein the aryloxy ether polyol is derived from a dihydric phenol having an estrogenic agonist activity in an MCF-7 assay less than or equal to that of 4,4'-(1,4-phenylenebis(propane-2,2-diyl)) diphenol.

4. A coating composition according to claim 1, wherein the cyclic carbonate comprises ethylene carbonate, propylene carbonate, butylene carbonate or glycerine carbonate.

5. A coating composition according to claim 1, wherein the polyester polymer is derived from ingredients including:
    a) maleic acid, fun is acid, succinic acid, adipic acid, phthaiic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, tetrahydrophthalic acid, isophthalic acid, terephthalic acid, naphthalene dicarboxylic acid, cyclohexane dicarboxylic acid, glutaric acid, a dimer fatty acid, or an anhydride, alkyl ester or mixture thereof, and
    b) ethylene glycol, propylene glycol, 1,3-propanediol, 2-methyl-1,3-propanediol, 2-butyl-2-ethyl-1,3-propanediol, glycerol, diethylene glycol, dipropylene glycol, triethylene glycol, trimethylolpropane, trimethylolethane, tripropylene glycol, neopentyl glycol, pentaerythritol, 1,2-butanediol, 1,3-butanediol, 1,4-butanediol, 1,2-pentanediol, 1,3-pentanediol, 1,4-pentanediol, 2-methyl-2,4-pentanediol, 4-methyl-2,4-pentanediol, 2,2,4-trimethyl 1-3-pentanediol, 1,5-pentanediol, 1,6-hexanediol, 2,2-dimethyl-1,3-hexanediol, cyclohexanedimethanol, a polyethylene or polypropylene glycol, isopropylidene bis (p-phenylene-oxypropanol-2), hydroxypivalyl hydroxypivalate or mixture thereof.

6. A coating composition according to claim 1, wherein the polyester polymer is water dispersible or water soluble.

7. A coating composition according to claim 1, further comprising a carrier liquid comprising an organic solvent, water, or mixture thereof.

8. A coating composition according to claim 1, wherein the polyester polymer is substantially free of mobile bisphenol A (BPA) and aromatic glycidyl ether compounds.

9. A coating composition according to claim 1, wherein the coating composition comprises about 10 to about 90 wt. % of the polyester polymer, about 0.1 to about 15 wt. % crosslinker, 0 to about 3 wt. % catalyst and an optional carrier.

10. A food or beverage container article coated on at least one interior surface with a coating composition according to claim 1.

11. A coating composition according to claim 1, wherein at least one $R^1$ comprises a branched hydrocarbon group or an alkenyl group.

12. A coating composition according to claim 1, wherein at least one $R^1$ comprises a branched hydrocarbon group.

13. A coating composition according to claim 1, wherein $R^2$ is a hydrogen.

14. A coating composition comprising:
(a) a polyester polymer derived by esterifying an aryloxy ether polyol derived from reaction between ingredients including a dihydric phenol and a non-hydroxyl functional cyclic carbonate to provide a diol having Formula III:

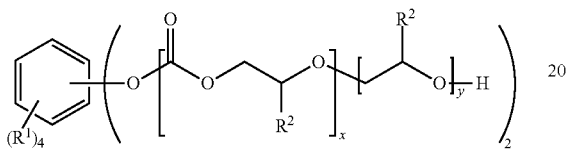

wherein:
each $R^1$ may be the same or different and independently is a monovalent atom or a monovalent organic group and may contain heteroatoms;
$R^2$ is hydrogen an organic group;
x is nearly 0 to about 2; and
y is to about 10,
wherein the aryloxy ether polyol is derived from catechol, a substituted catechol, a substituted hydroquinone, resorcinol, a substituted resorcinol, or mixture thereof;
(b) crosslinker; and
(c) an optional catalyst.

15. A coating composition comprising:
(a) a polyester polymer derived by esterifying an aryloxy ether polyol derived from reaction between ingredients including a dihydric phenol and a non-hydroxyl functional cyclic carbonate to provide a diol having Formula III:

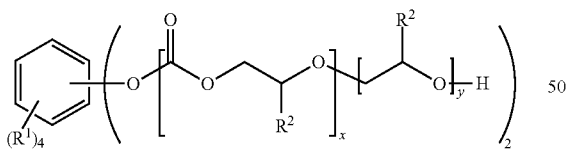

wherein:
each $R^1$ may be the same or different and independently is a monovalent atom or a monovalent organic group and may contain heteroatoms;
$R^2$ is hydrogen or an organic group;
x is nearly 0 to about 2; and
y is 1 to about 10,
wherein the polyester polymer has an acid number less than about 20, a number average molecular weight (Mn) of at least about 1,000 and less than about 20,000, and a Tg of at least 0° C. and less than 100° C.;
(b) a crosslinker; and
(c) an optional catalyst.

16. A coating composition comprising:
(a) a polyester polymer derived by esterifying an aryloxy ether polyol derived from reaction between ingredients including a dihydric phenol and a non-hydroxyl functional cyclic carbonate to provide a diol having Formula III:

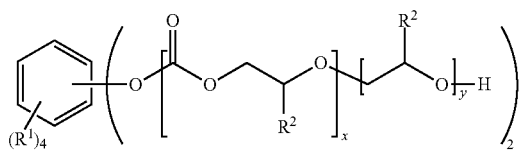

wherein:
each $R^1$ be the same or different and independent is a monovalent atom or a monovalent organic group and may contain heteroatoms;
$R^2$ is hydrogen or an organic group;
x is nearly 0 to about 2; and
y is 1 to about 10;
(b) crosslinker, wherein the crosslinker comprises a phenolic crosslinker, amino crosslinker, blocked isocyanate crosslinker, material containing oxirane groups, or combination thereof; and
(c) an optional catalyst.

17. A food or beverage container article coated on at least one interior food-contact surface with a coating composition comprising:
(a) a polyester polymer derived by esterifying aryloxy ether polyol derived from reaction between ingredients including a dihydric phenol and a non-hydroxyl functional cyclic carbonate to provide a diol having Formula III:

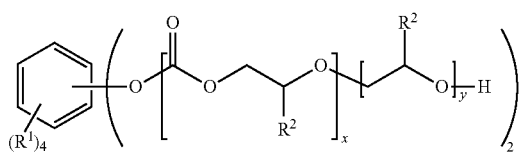

wherein:
each $R^1$ may be the same or different and independently is a monovalent atom or a monovalent organic group and may contain heteroatoms;
$R^2$ is hydrogen or an organic group;
x is nearly 0 to about 2; and
y is 1 to 10;
(b) a crosslinker; and
(c) an optional catalyst.

18. A food or beverage container article coated on at least one interior surface with a coating composition comprising:
(a) a polyester polymer derived by esterifying an aryloxy ether polyol derived from reaction between ingredients including a dihydric phenol and a non-hydroxyl functional cyclic carbonate to provide a diol having Formula III:

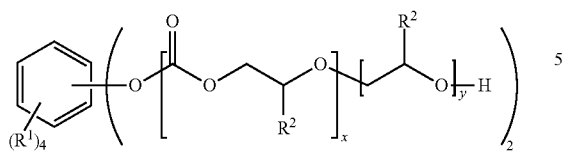

wherein:
 each $R^1$ may be the same or different and independent is a monovalent atom or a monovalent organic group and may contain heteroatoms;
 $R^2$ is hydrogen or an organic group;
 x is nearly 0 to about 2; and
 y is 1 to about 10;
(b) a crosslinker; and
(c) an optional catalyst,
wherein the interior surface comprises a food-contact surface and the article comprises a food or beverage can.

\* \* \* \* \*